US010674269B2

(12) United States Patent
Riha

(10) Patent No.: US 10,674,269 B2
(45) Date of Patent: Jun. 2, 2020

(54) GROUP CONVERSATION FEATURE FOR EARMUFFS

(71) Applicant: HONEYWELL INTERNATIONAL INC., Morris Plains, NJ (US)

(72) Inventor: Jan Riha, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/318,183

(22) PCT Filed: Jul. 7, 2017

(86) PCT No.: PCT/US2017/041013
§ 371 (c)(1),
(2) Date: Jan. 16, 2019

(87) PCT Pub. No.: WO2018/017338
PCT Pub. Date: Jan. 25, 2018

(65) Prior Publication Data
US 2019/0268698 A1 Aug. 29, 2019

Related U.S. Application Data

(60) Provisional application No. 62/364,123, filed on Jul. 19, 2016.

(51) Int. Cl.
*H04R 5/033* (2006.01)
*H04W 76/14* (2018.01)
(Continued)

(52) U.S. Cl.
CPC .............. *H04R 5/033* (2013.01); *H04M 1/05* (2013.01); *H04M 1/6066* (2013.01);
(Continued)

(58) Field of Classification Search
CPC ...... H04R 5/033; H04R 1/1083; H04R 29/00; H04R 2201/10; H04W 76/14;
(Continued)

(56) References Cited

U.S. PATENT DOCUMENTS

2003/0100274 A1 5/2003 Brown
2008/0125038 A1* 5/2008 Yuval ................. H04M 1/6066
455/41.2
(Continued)

FOREIGN PATENT DOCUMENTS

WO 2007/121414 A2 10/2007

OTHER PUBLICATIONS

International Search Report and Written Opinion for Application No. PCT/US2017/041013 dated Aug. 14, 2017, 13 pages.

*Primary Examiner* — Andrew L Sniezek
(74) *Attorney, Agent, or Firm* — Alston & Bird

(57) ABSTRACT

Embodiments include a communication system and method for establishing a wireless communication system. A method may comprise monitoring, by a first headset, a distance between the first headset and a second headset; when the distance between the first headset and the second headset is less than a predefined limit, establishing a voice channel between the first headset and the second headset; allowing voice communication via the voice channel between the first headset and the second headset, wherein the first headset and the second headset comprise a microphone and a speaker; and when the distance between the first headset and the second headset increases to greater than the predefined limit, ending the established voice channel between the first headset and the second headset.

18 Claims, 2 Drawing Sheets

(51) Int. Cl.
  *H04W 76/11* (2018.01)
  *H04M 3/56* (2006.01)
  *H04W 4/02* (2018.01)
  *H04M 1/60* (2006.01)
  *H04M 1/725* (2006.01)
  *H04R 1/10* (2006.01)
  *H04M 1/05* (2006.01)
  *H04W 4/16* (2009.01)
  *H04W 8/00* (2009.01)
  *H04R 29/00* (2006.01)

(52) U.S. Cl.
  CPC ......... *H04M 1/7253* (2013.01); *H04M 3/568* (2013.01); *H04R 1/1083* (2013.01); *H04W 4/02* (2013.01); *H04W 4/023* (2013.01); *H04W 4/16* (2013.01); *H04W 76/11* (2018.02); *H04W 76/14* (2018.02); *H04R 29/00* (2013.01); *H04R 2201/10* (2013.01); *H04W 8/005* (2013.01)

(58) Field of Classification Search
  CPC ....... H04W 76/11; H04W 4/02; H04W 4/023; H04W 4/16; H04W 8/005; H04M 3/568; H04M 1/05; H04M 1/6066; H04M 1/7253
  See application file for complete search history.

(56) References Cited

U.S. PATENT DOCUMENTS

| | | |
|---|---|---|
| 2012/0317194 A1 | 12/2012 | Tian |
| 2014/0039894 A1* | 2/2014 | Shostak .................. G10L 15/04 704/251 |
| 2018/0227975 A1* | 8/2018 | Kihlberg ............... H04W 76/14 |

* cited by examiner

GROUP CONVERSATION FEATURE FOR EARMUFFS

CROSS-REFERENCE TO RELATED APPLICATIONS

The present application claims priority to U.S. Provisional Patent Application Ser. No. 62/364,123 filed Jul. 19, 2016 by Jan Řiha and entitled "Group Conversation Feature for Earmuffs" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When a worksite may have potentially hazardous elements, such as high noise levels, hazardous materials or chemicals, or dangerous equipment, personal protection equipment (PPE) may be required for a user to enter the worksite. PPE may include ear muffs, hard hats, helmets, boots, goggles, gloves, suits, hoods, gas detectors, protective clothing, hearing protection, bibs, coveralls, safety vests, gas detectors, respiration systems, among other PPE devices. A user may be required to wear multiple PPE devices when entering a work site.

SUMMARY

In an embodiment, a method of establishing a wireless communication system may comprise monitoring, by a first headset, a distance between the first headset and a second headset; when the distance between the first headset and the second headset is less than a predefined limit, establishing a voice channel between the first headset and the second headset; allowing voice communication via the voice channel between the first headset and the second headset, wherein the first headset and the second headset comprise a microphone and a speaker; and when the distance between the first headset and the second headset increases past (to greater than) the predefined limit, ending the established voice channel between the first headset and the second headset.

In an embodiment, a communication system may comprise a first headset comprising hearing protection, a microphone, a speaker, and a wireless module; a second headset comprising hearing protection, a microphone, a speaker, and a wireless module, wherein at least one of the headsets is configured to monitor distance between the first headset and the second headset; when the distance between the first headset and the second headset is less than a predefined limit, establish a voice channel between the first headset and the second headset; allow voice communication via the voice channel between the first headset and the second headset; and when the distance between the first headset and the second headset increases past (to greater than) the predefined limit, end the established voice channel between the first headset and the second headset.

In an embodiment, a headset may comprise hearing protection, a microphone, a speaker, and a wireless module, wherein the headset is configured to monitor distance between the first headset and a second headset; when the distance between the first headset and the second headset is less than a predefined limit, establish a voice channel between the first headset and the second headset; allow voice communication via the voice channel between the first headset and the second headset; and when the distance between the first headset and the second headset increases past (to greater than) the predefined limit, end the established voice channel between the first headset and the second headset.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
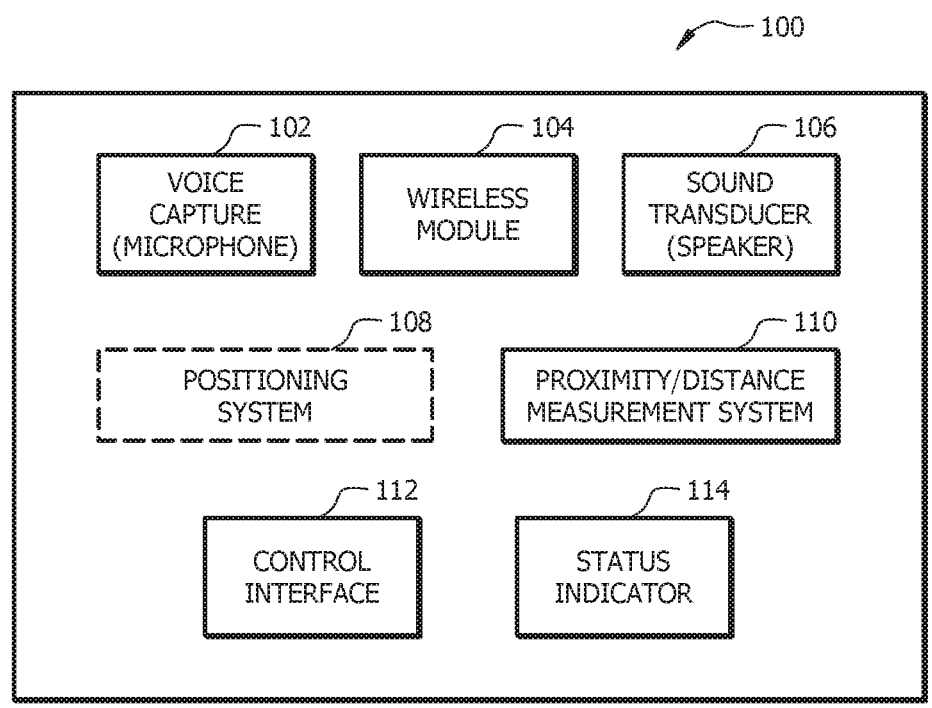
FIG. 1 illustrates a block diagram of a headset according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative plementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for providing group conversation capabilities for users wearing hearing protection.

In noisy environments, such as noisy production plants, etc., workers may be required to wear hearing protection, but there may still be a need for communication between the workers. Typical conversations may happen organically where a person walking near a conversation may be able to hear at least a portion of the conversation. Then they may join in the conversation if they wish. In noisy environments where most of the workers are wearing hearing protection, this type of group conversation is usually not possible.

Some embodiments of the disclosure include systems that utilize a voice communication channel. In some embodiments, any kind of low range radio frequency (RF) communication standard can be used (e.g. BlueTooth, WiFi, low power or proprietary protocol may be implemented). To capture the voice of a user, the hearing protection headset(s) may comprise a microphone. As an example, if person A approaches person B to within a predetermined distance, the headset(s) may automatically create a voice channel between the two headsets, and they can start to talk. Additionally, if person C approaches person A and/or person B to within the predetermined distance, person C may be added to the voice channel. The distance between the headsets for entering the voice channel may be recognized or determined using RE signal strength. For example, the headsets may comprise a Receiver Signal Strength Indicator (RSSI). In other embodiments, other methods of determining proximity or distance may be used, such as ultrasound propagation. In some embodiments, establishing the voice channel may not require the user to input any kind of control or press a button, wherein the voice channel may be automatically created based on the distance between two or more headsets.

In some embodiments, the headset may comprise an indicator of some kind configured to indicate when the headset is in an established voice channel (or "conversation"). This may indicate to the user that they may start talking with the other user(s) on the voice channel. One example of an indicator may be an LED light that is visible on the exterior of the headset. Another example of an indicator may include audible indicators issued via a speaker in the headset. In some embodiments, a multiple color light may be used as an indicator, where headsets that are communicating on the same voice channel may be indicated with the same color light, and different groups on different voice channels may have different colors.

In some embodiments, a user may be able to control the voice channel by pressing one or more buttons. For example, if a voice channel is established and the user wishes to prevent any other users from entering the voice channel, a user may activate a private conversation by pressing the button. Additionally, if a user wishes to block anyone from establishing a voice channel with their headset, the user may activate a "Do Not Disturb" function on the headset. In some embodiments, the distance or range for starting a voice channel may be controlled on the headset.

Referring now to FIG. 1, a block diagram of an exemplary embodiment of a headset is shown, where the headset 100 comprises hearing protection. The headset 100 may comprise earmuffs, earplugs, or any other suitable device for hearing protection and voice communication purposes. In some embodiments, the headset 100 may comprise a voice capturing device 102 or microphone, which may comprise a microphone. The voice capturing system may be built in such a way as to reliably capture the voice of the person wearing the headset 100, even in the noisy environment. Depending on the construction of the headset 100, there might be one or more microphones 102 in one headset 100. The headset 100 may also comprise a wireless module 104 configured to transfer data to and/or from the headset 100. The wireless module 104 may be configured to transfer audio (voice) signal captured by the microphone 102 by means of electromagnetic waves. The wireless module 104 may also be configured to transfer any digital and/or analog data representing the distance between the headset 100 and other headsets in the area.

In some embodiments, the headset 100 may comprise a sound transducer 106 or speaker. The speaker 106 may be configured to communicate audio to the user. The audio may be from voice input from another headset and/or from a status indicator 114. The status indicator 114 may comprise visual and/or audible indicators for the user and other users indicating the status of communication between the headset 100 and other headsets. The status indicator 114 may be configured to indicate statuses such as power-on, do-not-disturb mode, private mode, start conversation, end conversation, etc. in some embodiments, the status indicator 114 may comprise an audio notification to the user that the headset 100 has established communication with another headset and/or left communication with another headset. In some embodiments, the status indicator 114 may comprise a light (or LED) located on the exterior of the headset 100. In some embodiments, the status indicator 114 may comprise a multi-color light configured to change colors based on the status of the headset 100. The light may be placed in a visible location on the headset 100, so that other users may be able to see the light.

In some embodiments, the headset 100 may comprise a proximity (or distance) measurement system 110. The proximity measurement system 110 may be configured to measure the distance between the headset 100 and other surrounding headset(s). In some embodiments, the proximity measurement system 110 may use RF signal strength to determine distance. In some embodiments, the proximity measurement system 110 may use ultrasonic transmission to/from the headset 100. Each headset 100 may comprise an ultrasonic transmitter and receiver, where the transmitter may send a unique pulse (datagram, modulated sound pattern) and the receiver of another headset may respond with another unique pulse. The delay of the response from the other headset can be used to determine a distance measurement. Using ultrasonic transmission may provide increased accuracy.

In some embodiments, the headset 100 may comprise a positioning system 108. The positioning system 108 may be used instead of, or in combination with, the proximity measurement system 110. The positioning system 108 may be configured to locate the headset 100 in terms of coordinates within a certain area, such as a global positioning system (GPS). Alternatively, an indoor positioning system may be used. In some embodiments, the headset 100 may comprise one or more control buttons 112. The control buttons 112 may comprise any type of control input, such as buttons, switches, knobs, touch screens, etc.

Figure 2:
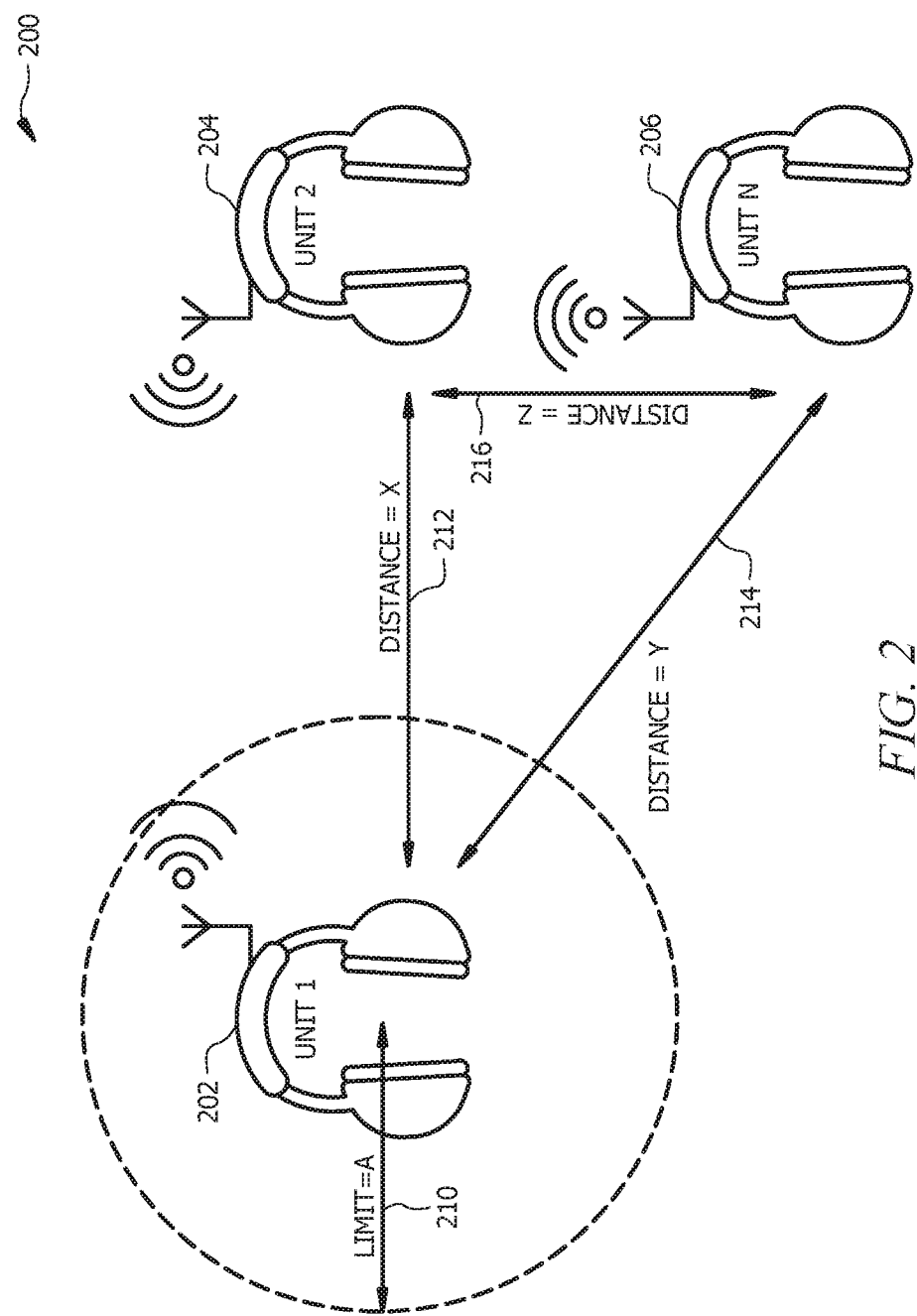
FIG. 2 illustrates a communication system according to an embodiment of the disclosure.

Referring now to FIG. 2, a communication system 200 is shown, where the communication system 200 comprises one or more headsets 202, 204, 206. Each headset 202, 204, 206 may be worn by a user. Each headset 202, 204, 206 may comprise one or more hearing protection elements 220 (which may also be referred to as "heating protection"). When a first headset 202 is powered on, the headset 202 detects the presence of other active headsets 204, 206 in a nearby area. In some embodiments, the area for detection may be approximately 10 meters. The headset 202 may also comprise a limit A 210 for distance to establish a voice channel (or "conversation"). In some embodiments, the limit A 210 may be between approximately 2 to 3 meters. In some embodiments, the limit 210 may be less than approximately 2 meters.

When the first headset 202 detects that there are one or more headsets 204, 206 nearby, the first headset 202 may measure and/or calculate the distance from the first headset 202 to the other active headset(s) 204, 206. The distances between the headsets 202, 204, 206 are notated by distance x 212, distance y 214, and distance z 216. As an example, if the distance x 212 between the first headset 202 and a second headset 204 is less than the limit A 210, a voice channel may be established between the headsets 202 and 204. Once the voice channel is established, the users wearing the headsets 202 and 204 can speak to each other simultaneously without needing to press a button or other control.

Additionally, if the distance y 214 and/or the distance z 216 are less than the limit A 210 (of one or both of the headsets 202 and 204), a third headset 206 may be added to the voice channel between the first and second headsets 202 and 204.

There may exist several methods for establishing and controlling the voice channel(s) between a plurality of headsets. In one embodiment, when a first voice channel is established between two headsets, any other headsets that come within the limit A 210 of either of the two headsets may be added to the group voice channel. Alternatively, separate voice channels may be established between certain headsets depending on the distances between the headsets.

In an example, if the distances x 212, y 214, and z 216 are all less than the limit A 210, a voice channel may be established between the three headsets 202, 204, and 206, In another example, if the distances x 212 and y 214 are less than limit A 210, but the distance z 216 is greater than limit A 210, a first voice channel may be established between the first and second headsets 202 and 204, and a second voice channel may be established between first and third headsets 202 and 206, where the second and third headsets 204 and 206 may not be in direct communication with one another. The principles and methods described above may be applied to any number of headsets.

In some embodiments, the limit A 210 may be a distance that is defined in the design and manufacturing of the headsets 202, 204, and 206, where the limit A 210 may be the same for each of the headsets. In some embodiments, the limit A 210 may be controlled and/or adjusted for each headset individually. For example, the limit A 210 may be adjusted via input to the headset from a user and/or the limit A 210 may be adjusted automatically based on other information input to the headset.

In some embodiments, once a voice channel is established between two headsets 202 and 204 (for example), if the distance x 212 between the headsets 202 and 204 decreases (while within the limit A 210), the volume of the voice channel may be increased, simulating natural voice communication.

In a first embodiment, a method of establishing a wireless communication system comprises monitoring, by a first headset, a distance between the first headset and a second headset; when the distance between the first headset and the second headset is less than a predefined limit, establishing a voice channel between the first headset and the second headset; allowing voice communication via the voice channel between the first headset and the second headset, wherein the first headset and the second headset comprise a microphone and a speaker; and when the distance between the first headset and the second headset increases past (to greater than) the predefined limit, ending the established voice channel between the first headset and the second headset.

A second embodiment can include the method of the first embodiment, further comprising, before ending the established voice channel between the first headset and the second headset, monitoring, by the first headset, the distance between the first headset and a third headset; when the distance between the first headset and the third headset is less than the predefined limit, adding the third headset to the established voice channel; and allowing voice communication via the voice channel between the first headset, the second headset, and the third headset.

A third embodiment can include the method of the first or second embodiments, further comprising, before ending the established voice channel between the first headset and the second headset, monitoring, by the second headset, the distance between the second headset and the third headset; when the distance between the second headset and the third headset is less than the predefined limit, adding the third headset to the established voice channel; and allowing voice comms nication via the voice channel between the first headset, the second headset, and the third headset.

A fourth embodiment can include the method of any of the first to third embodiments, further comprising monitoring, by the first headset, the distance between the first headset and the third headset; when the distance between the first headset and the third headset is less than the predefined limit, establishing a second voice channel between the first headset and the third headset; and allowing voice communication via the second voice channel between the first headset and the third headset.

A fifth embodiment can include the method of any of the first to fourth embodiments, further comprising monitoring, by the second headset, the distance between the second headset and the third headset; when the distance between the second headset and the third headset is less than the predefined. In stablishing a third voice channel between the second headset and the third headset; and allowing voice communication via the third voice channel between the second headset and the third headset.

A sixth embodiment can include the method of any of the first to fifth embodiments, wherein monitoring the distance comprises detecting a radio frequency signal strength of the second headset relative to the first headset.

A seventh embodiment can include the method of any of the first to sixth embodiments, further comprising indicating, via an indicator on at least one of the headsets, that a voice channel has been established.

An eighth embodiment can include the method of the seventh embodiment, wherein the indicator comprises an audio alert.

A ninth embodiment can include the method of the seventh embodiment, wherein the indicator comprises a light on the exterior of the headset.

A tenth embodiment can include the method of the ninth embodiment, wherein the indicator comprises a multi-color light, and wherein different colors indicate different statuses of the headset.

An eleventh embodiment can include method of the ninth embodiment, wherein the indicator comprises a multi-color light and wherein different colors indicate different voice channels.

A twelfth embodiment can include the method of any of the first to eleventh embodiments, further comprising receiving, by at least one of the headsets, a do-not-disturb command; and preventing any other headsets from being added to the voice channel.

A thirteenth embodiment can include the method of any of the first to twelfth embodiments, further comprising, after establishing the voice channel, increasing the volume of the voice channel when the distance between the first headset and the second headset decreases.

In a fourteenth embodiment, a communication system comprises a first headset comprising hearing protection, a microphone, a speaker, and a wireless module; a second headset comprising hearing protection, a microphone, a speaker, and a wireless module, wherein at least one of the headsets is configured to monitor distance between the first headset and the second headset; when the distance between the first headset and the second headset is less than a predefined limit, establish a voice channel between the first headset and the second headset; allow voice communication via the voice channel between the first headset and the second headset; and when the distance between the first headset and the second headset increases past (to greater than) the predefined limit, end the established voice channel between the first headset and the second headset.

A fifteenth embodiment can include the communication system of the fourteenth embodiment, wherein the distance is monitored by detecting the signal strength of the wireless module(s).

A sixteenth embodiment can include the communication sensor of the fourteenth or fifteenth embodiments, further comprising a third headset comprising hearing protection, a microphone, a speaker, and a wireless module, wherein at least one of the headsets is configured to monitor the distance between the first headset and the third headset; when the distance between the first headset and the third headset is less than the predefined limit, add the third headset to the established voice channel; and allow voice communication via the voice channel between the first headset, the second headset, and the third headset.

A seventeenth embodiment can include the communication sensor of any of the fourteenth to sixteenth embodiments, further comprising a third headset comprising hearing protection, a microphone, a speaker, and a wireless module, wherein at least one of the headsets is configured to monitor the distance between the second headset and the third headset; when the distance between the second headset and the third headset is less than the predefined limit, add the third headset to the established voice channel; and allow voice communication via the voice channel between the first headset, the second headset, and the third headset.

An eighteenth embodiment can include the communication sensor of any of the fourteenth to seventeenth embodiments, further comprising a third headset comprising hearing protection, a microphone, a speaker, and a wireless module, wherein at least one of the headsets is configured to monitor the distance between the first headset and the third headset; when the distance between the first headset and the third headset is less than the predefined limit, establish a second voice channel between the first headset and the third headset; and allow voice communication via the second voice channel between the first headset and the third headset.

A nineteenth embodiment can include the communication sensor of any of the fourteenth to eighteenth embodiments, further comprising a third headset comprising hearing protection, a microphone, a speaker, and a wireless module, wherein at least one of the headsets is configured to monitor the distance between the second headset and the third headset; when the distance between the second headset and the third headset is less than the predefined limit, establish a third voice channel between the second headset and the third headset; and allow voice communication via the third voice channel between the second headset and the third headset.

In a twentieth embodiment, a headset comprises hearing protection, a microphone, a speaker, and a wireless module, wherein the headset is configured to monitor distance between the first headset and a second headset; when the distance between the first headset and the second headset is less than a predefined limit, establish a voice channel between the first headset and the second headset; allow voice communication via the voice channel between the first headset and the second headset; and when the distance between the first headset and the second headset increases past (to greater than) the predefined limit, end the established voice channel between the first headset and the second headset.

While various embodiments in accordance with the principles disclosed herein have been shown and described above, modifications thereof may be made by one skilled in the art without departing from the spirit and the teachings of the disclosure. The embodiments described herein are representative only and are not ntended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosureinto the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the inventions) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of establishing a wireless communication system, the method comprising:
   monitoring, by a first headset, a distance between the first headset and a second headset;
   when the distance between the first headset and the second headset is less than a predefined limit, establishing a voice channel between the first headset and the second headset;
   allowing voice communication via the voice channel between the first headset and the second headset, wherein the first headset and the second headset comprise a microphone and a speaker; and
   when the distance between the first headset and the second headset increases to greater than the predefined limit, ending the established voice channel between the first headset and the second headset; and
   preventing any other headsets from being added to the voice channel, in an instance when one or more buttons on at least one of the first or second headsets is activated for a do-not-disturb command.

2. The method of claim 1, further comprising, before ending the established voice channel between the first headset and the second headset:
   monitoring, by the first headset, a distance between the first headset and a third headset;
   when the distance between the first headset and the third headset is less than the predefined limit, adding the third headset to the established voice channel; and
   allowing voice communication via the voice channel between the first headset, the second headset, and the third headset.

3. The method of claim 1, further comprising, before ending the established voice channel between the first headset and the second headset:
   monitoring, by the second headset, the distance between the second headset and a third headset;
   when the distance between the second headset and the third headset is less than the predefined limit, adding the third headset to the established voice channel; and
   allowing voice communication via the voice channel between the first headset, the second headset, and the third headset.

4. The method of claim 1, further comprising:
   monitoring, by the first headset, a distance between the first headset and third headset;
   when the distance between the first headset and the third headset is less than the predefined limit, establishing a second voice channel between the first headset and the third headset; and
   allowing voice communication via the second voice channel between the first headset and the third headset.

5. The method of claim 1, further comprising:
   monitoring, by the second headset, the distance between the second headset and the third headset;
   when the distance between the second headset and the third headset is less than the predefined limit, establishing a third voice channel between the second headset and the third headset; and
   allowing voice communication via the third voice channel between the second headset and the third headset.

6. The method of claim 1, wherein monitoring the distance comprises detecting a radio frequency signal strength of the second headset relative to the first headset.

7. The method of claim 1, further comprising indicating, via an indicator on at least one of the headsets, that the voice channel has been established.

8. The method of claim 7, wherein the indicator comprises an audio alert.

9. The method of claim 7, wherein the indicator comprises a light on the exterior of the.

10. The method of claim 9, wherein the indicator comprises a multi-color light, and wherein different colors indicate different statuses of the at least one of the first or second headsets.

11. The method of claim 9, wherein the indicator comprises a multi-color light and wherein different colors indicate different voice channels.

12. The method of claim 1, further comprising, after establishing the voice channel, increasing a volume of the voice channel when the distance between the first headset and the second headset decreases.

13. A communication system comprising:
   a first headset comprising hearing protection, a microphone, a speaker, and a wireless module;
   a second headset comprising hearing protection, a microphone, a speaker, and a wireless module, wherein at least one of the first or second headsets is configured to:
   monitor distance between the first headset and the second headset;
   when the distance between the first headset and the second headset is less than a predefined limit, establish a voice channel between the first headset and the second headset;
   allow voice communication via the voice channel between the first headset and the second headset; and
   when the distance between the first headset and the second headset increases to greater than the predefined limit, end the established voice channel between the first headset and the second headset; and
   prevent any other headsets from being added to the voice channel, in an instance when a button of one or more buttons on the at least one of the first or second headsets is pressed for a do-not-disturb command.

14. The communication system of claim 13, wherein the distance is monitored by detecting a signal strength of one or more wireless modules.

15. The communication system of claim 13, further comprising a third headset comprising hearing protection, a microphone, a speaker, and a wireless module, wherein at least one of the first, second, or third headsets is configured to:
- monitor a distance between the first headset and the third headset;
- when the distance between the first headset and the third headset is less than the predefined limit, add the third headset to the established voice channel; and
- allow voice communication via the voice channel between the first headset, the second headset, and the third headset.

16. The communication system of claim 13, further comprising a third headset comprising hearing protection, a microphone, a speaker, and a wireless module, wherein at least one of the first, second, or third headsets is configured to:
- monitor a distance between the second headset and the third headset;
- when the distance between the second headset and the third headset is less than the predefined limit, add the third headset to the established voice channel; and
- allow voice communication via the voice channel between the first headset, the second headset, and the third headset.

17. The communication system of claim 13, further comprising a third headset comprising hearing protection, a microphone, a speaker, and a wireless module, wherein at least one of the first, second, or third headsets is configured to:
- monitor a distance between the first headset and the third headset;
- when the distance between the first headset and the third headset is less than the predefined limit, establish a second voice channel between the first headset and the third headset; and
- allow voice communication via the second voice channel between the first headset and the third headset.

18. The communication system of claim 13, further comprising a third headset comprising hearing protection, a microphone, a speaker, and a wireless module, wherein at least one of the first, second, or third headsets is configured to:
- monitor a distance between the second headset and the third headset;
- when the distance between the second headset and the third headset is less than the predefined limit, establish a third voice channel between the second headset and the third headset; and
- allow voice communication via the third voice channel between the second headset and the third headset.

* * * * *